United States Patent [19]

Anger

[11] Patent Number: 4,804,260
[45] Date of Patent: Feb. 14, 1989

[54] TEMPLE FOR EYEGLASSES

[75] Inventor: Wilhelm Anger, Moritz-Suvretta, Switzerland

[73] Assignee: Eyemetrics - Systems AG, Postfach, Switzerland

[21] Appl. No.: 925,678

[22] Filed: Oct. 31, 1986

[30] Foreign Application Priority Data

Feb. 12, 1986 [DE] Fed. Rep. of Germany ....... 3604358

[51] Int. Cl.$^4$ ............................................... G02C 5/20
[52] U.S. Cl. .................................................. 351/118
[58] Field of Search ...................... 351/111, 115, 118; 411/333, 334, 335, 336, 301, 310, 309, 311, 427, 938

[56] References Cited

U.S. PATENT DOCUMENTS

| | | | |
|---|---|---|---|
| 2,856,813 | 10/1958 | Kudelko | 351/118 |
| 3,249,141 | 5/1966 | Newsohotz | 411/310 |
| 3,612,668 | 5/1970 | Watkins | 351/118 |

FOREIGN PATENT DOCUMENTS 1028629  2/1953  France ................................. 411/437

OTHER PUBLICATIONS

Webster's Ninth New Collegiate Dictionary © 1986, p. 242.

*Primary Examiner*—Rodney B. Bovernick
*Assistant Examiner*—Jay Ryan
*Attorney, Agent, or Firm*—Roth & Goldman

[57] ABSTRACT

A temple for a pair of eyeglasses with a longitudinal shaft and a temple end piece exhibits a telescoping connection between a first segment of the temple end piece and the shaft end facing this temple end piece. The connection further comprises a fixation device, which fixes or holds the shaft and end piece together. Either of the opposed walls of the telescoping connection are designed to be essentially cylindrical. Preferably, numerous ribs protrude radially from the other wall with the ribs running in the axial direction of the connection and finally holding the telescoping connection together. On account of this, the angle of the temple end piece with respect to the hinge on the temle shaft can be adjusted during assembly and then a connection is created between the temple end piece and the shaft which is resistant to rotational as well as pulling forces.

10 Claims, 2 Drawing Sheets

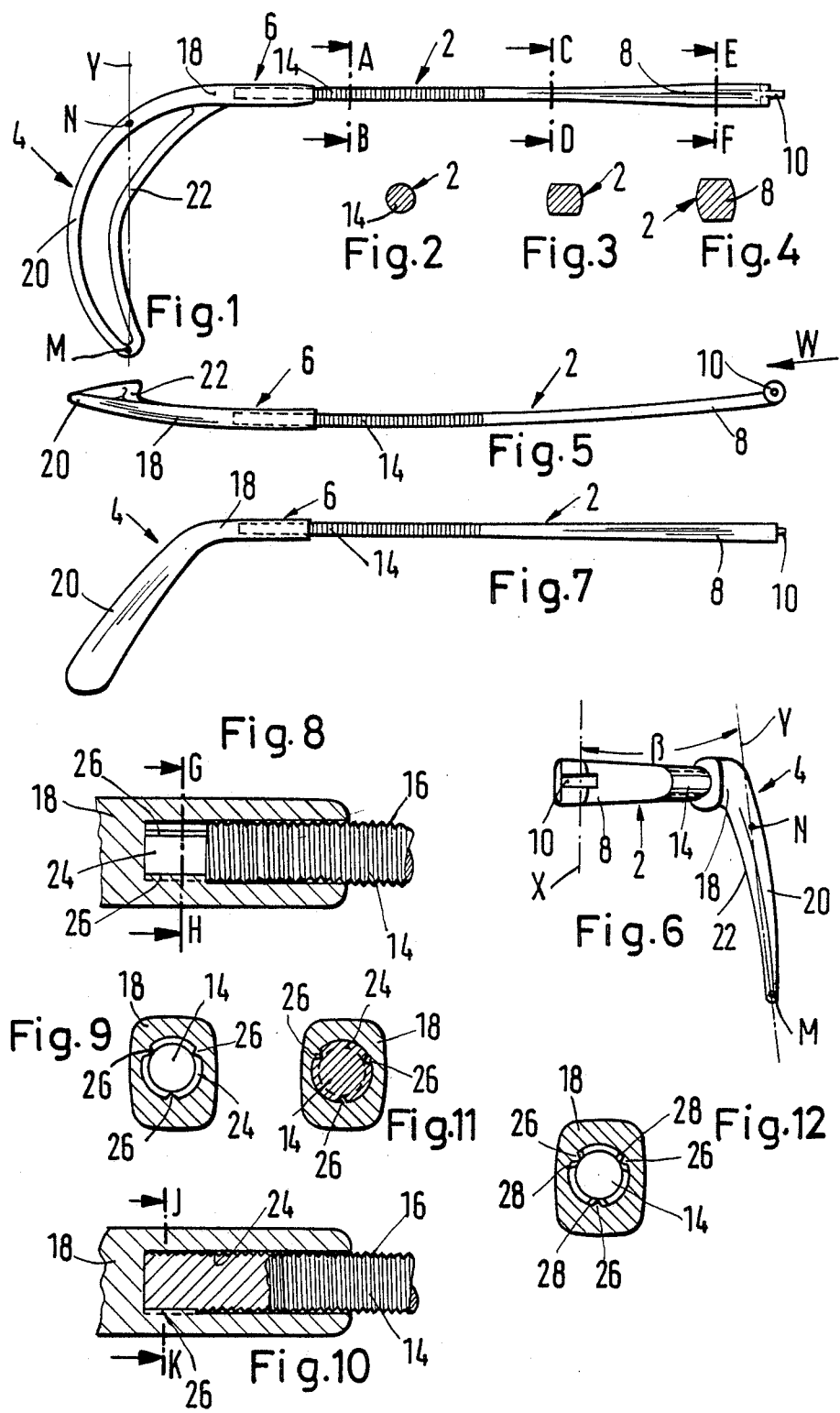

TEMPLE FOR EYEGLASSES

FIELD OF THE INVENTION

The invention relates to a temple for eyeglasses with a longitudinal, essentially straight shaft, which can be connected with a cheekpiece or a hinge of the eyeglasses via a hinge joint, and with a temple end piece having a longitudinal, essentially straight first segment, which forms an extension of the shaft, and a second longitudinal segment, joining the first segment, which runs downward with respect to the first segment with the inclusion of an angle of less than 180°.

Prior Art

A temple of this type is essentially known. The second segment of the temple end piece serves the function either to itself lie against the cranium behind the ear of the wearer of the glasses or to support a further segment of the temple end piece, which lies against the cranium and/or the ear of the wearer of the glasses. In either case, the engagement of the second segment, or of the further segment supported by the second segment, serves the purpose that the temple, together with a second temple of the same type on the other side of the head, together with the bridge of the eyeglasses, holds and supports the eyeglasses firmly on the head of the wearer of the glasses. The temple can fulfill this objective the sooner the better it is adjusted to the individual geometry of the ear and head of the wearer of the glasses. The inner inclination of the contact surface on the head and/or on the ear, which the inner inclination of the temple end piece should follow, is also part of the geometry of the head. Conventional temple end pieces of the type described, however, are principally manufactured with one and the same inner inclination, with an attempt to produce a suitable inner inclination of the temple end piece, respectively of the second segment, at most being made on account of the plastic deformation, for example, by the fitting optometrist. Most often, this adjustment is made simultaneously with the adjustment of the length of the temple. Since this relates to the act of trying something on, the result is often insufficient, which results in a poor wearing comfort of the eyeglasses.

A similar pair of eyeglasses is shown in my prior application Ser. No. 660,739 filed Oct. 15, 1984. These known eyeglasses exhibit a telescoping connection between the temple shaft and the temple end piece, which allows, on account of cutting the temple shaft to length prior to the joining of the temple shaft and the temple end piece, to produce the correct length of the temple. Opportunities to adjust the inward inclination of the temple end piece do not exist in that case. Rather, the bore-hole formed in the first segment of the temple end piece, as well as the second shaft end, have an approximately rectangular profile, by which the inner inclination of the temple end piece is pre-determined.

OBJECT OF THE INVENTION

The object of the present invention is to provide a connection between the temple shaft and end piece in which the inward angle of the end piece can be easily adjusted and firmly held in the desired position relative to the shaft.

SUMMARY AND ADVANTAGE OF THE INVENTION

This objective is realized in accordance with the invention essentially on account of the fact that at least one wall of the telescoping connection is essentially cylindrical and on account of the fact that webs or ribs protrude radially from the other wall with those ribs, running in the axial direction of the connection being in a mesh with the essentially cylindrical opposed wall. On account of the essentially cylindrical shape of one of the walls, one of the telescopically engaged parts can be inserted into other under any desired angle of rotation of one of the parts relative to the other part, in order to produce a desired, inner inclination of the temple end piece. On account of the meshing of at least one of the ribs, which runs in an axial direction, with the opposite wall, the telescoping connection is particularly stiff such that the adjusted angle of the inclination is fixed by this meshing. Therefore, in the case of the temple according to the invention, that at least one rib forms the fixation device of the telescoping connection together with that area of the wall into which it grips. In addition to this, the fixation can be supported by further flexible and/or positive connections between the telescoping parts.

In the preferred embodiment of the invention, provisions are made that a number of axially running ribs are located at the closed end of the bore-hole, which extend only over a portion of the legnth of the bore-hole. This makes it possible to insert the essentially cylindrical male part into the female part in an at first gliding manner, without any fixation taking place. The desired inner inclination, that is the angle of rotation between the temple end piece and the shaft, is adjusted in this state. When the desired angle has been obtained, the male part is completely inserted into the female part, which causes the ribs to mesh with the wall at the free end of the male part and to produce a simultaneous positive and flexible meshing, on account of which the temple end piece and the shaft are firmly connected to one another.

The option described above, namely to connect the temple end piece and the shaft in two steps in such a manner that the male part is inserted only partially at first and that the inner inclination of the temple is adjusted during this step, after which the male part is inserted completely, with the fixation occurring at the same time, also exists in the case of a telescoping connection, which has the ribs, which run in the axial direction, on the male part. The this case, the female part preferably has a narrowed segment near its closed end or the ribs are designed to be located only over a portion of the length of the male part near the open end of the female part.

A further preferred embodiment of the invention can make provision for the fact that the essentially cylindrical wall, which is not furnished with ribs, has a number of rotative grooves. On account of the interaction of these grooves and the webs or threads therebetween with the longitudinally extending ribs, the ribs interlock with the webs in such a manner that a particularly stable fixation is achieved. The effect occurs particularly when, as is preferred, both the male and the female parts of the telescoping connection are made of a plastic. Polyether imides are particularly well suited plastics for this purpose.

Further advantages and characteristics of the invention will be apparent from the following detailed description of the embodiments shown in the drawings in which:

FIG. 1 is a side view of first embodiment of a temple;

FIG. 2 is an enlarged sectional illustration cross-section taken at line A-B in FIG. 1;

FIG. 3 is an enlarged cross-section taken at line C-D in FIG. 1;

FIG. 4 is an enlarged cross-section taken at line E-F in FIG. 1;

FIG. 5 is a top view of the temple of FIG. 1;

FIG. 6 is a perspective view of the temple in the direction of the arrow W in FIG. 5;

FIG. 7 is a side view of a second embodiment of a temple;

FIG. 8 is an enlarged sectional illustration of a telescoping connection of the temple in accordance with the first embodiment prior to the complete assembly of a temple shaft and a temple end piece;

FIG. 9 is a cross-section taken at line G-H in FIG. 8;

FIG. 10 is a cross-section similar to FIG. 8, which, however, shows the telescoping connection after the complete insertion of the male part into the female part;

FIG. 11 is a cross-section taken at line J-K in FIG. 10; and

FIG. 12 is a cross-section, similar to FIG. 9, of an altered embodiment.

Figure 13:
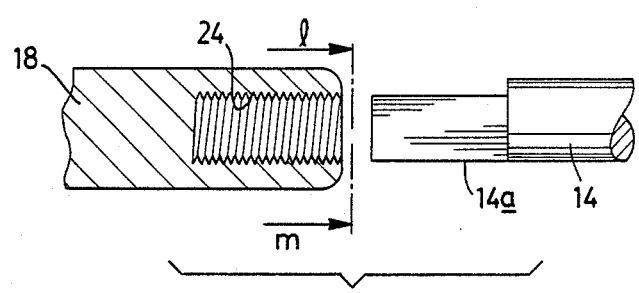
FIG. 13 is a cross section similar to FIG. 10 which, however, shows a modified embodiment.

The temple according to FIG. 1 comprises a longitudinal, essentially straight shaft 2, as well as a temple end piece 4, which is connected tightly with the shaft 2 via a telescoping connection 6.

The shaft 2 exhibits a first shaft end 8, in which an eye is formed, which, together with further non-illustrated elements, can form a hinge joint, with the help of which the temple can be connected with a non-illustrated cheekpiece or a non-illustrated hinge of a pair of eyeglasses. On account of the eye 10 and a hinge joint bore-hole 12, which is designed to be located in this eye, the course of the axis of the hinge joint X (see FIG. 6) is fixed.

The second, in FIGS. 1 and 2, left shaft end forms a male part 14, which has an essentially cylindrical wall and therefore a circular profile (see FIG. 2). Numerous grooves 16 and a corresponding number of webs between two neighboring grooves, are designed to be located on the wall of the circumference of the cylindrical male part. As is shown by FIG. 9, a saw-tooth profile of the wall of the male part 14 results on account of the grooves 16 and the webs. The segment of the shaft 2, which is grooved in this manner, extends over a quarter to one half of the entire length of the shaft. Over the grooved length, the shaft has the circular profile in accordance with FIG. 2 with a constant diameter. Thereafter, the profile of the shaft 2, in the direction of the first shaft end 8, slowly changes to the cross-section shown in FIG. 4 in the form of an oval, which is oblated at both ends.

As is shown in particular by FIGS. 1 and 5, the temple end piece 4 comprises a longitudinal, essentially straight first segment 18, which, at its back end, which is the left end in FIG. 1, slowly changes into a curved, second segment 20. In the case of the embodiment illustrated in FIGS. 1 to 5, the second segment 20, at its lower end, slowly changes into a longitudinal, curved apposition segment 22, which at its upper end, is again connected firmly with the first segment 18. The first segment 18 and the second segment 20 are designed to form one piece with one another and form a relatively stiff unit. The apposition segment 22, preferably consists of a relatively soft, pliant material of little stiffness, such that the apposition segment 22 can lie in contact with the ear and/or cranium of the wearer of the glasses possibly without any disturbing pressure points. The material, out of which the entire shaft 2 as well as the first segment 18 and the second segment 20 of the temple end piece 4 is manufactured, preferably is a polyether imide.

As is shown in particular in FIG. 5, the entire shaft 2 as well as the first segment of the temple end piece 4—when viewed from above—are somewhat curved, so that the temple, during the act of putting on the eyeglasses, leads the temple end piece to form the area of contact between the temple end piece and the cranium or the ear of the wearer without the shaft 2 itself coming into contact with the head of the wearer of the glasses and without the first segment 18 exerting a disturbing lateral pressure on the cranium. As is shown in particular in FIG. 6, aside from FIG. 5, the temple end piece 4 exhibits an inner inclination, which is made evident in FIG. 6 by the angle of inclination B, which—in the projection according to FIG. 6—includes the axis of the hinge joint X as well as the straight line of the inclination Y, which runs through the two points M and N (see FIG. 1).

In the following, with reference to FIGS. 8 to 11, the telescoping connection 6 between the temple end piece 4 and the shaft 2 is explained in more detail.

Aside from the male part 14, this telescoping connection comprises a female part or bore-hole 24, which is formed in the first segment 18, with the bore-hole exhibiting a cylindrical wall having a constant diameter over the entire length of the bore-hole 24. These ribs 26 are designed to be located at the, in FIG. 4, left end of the bore-hole 24, with the ribs running in the axial direction of the bore-hole and protruding radially into the bore-hole 24. In the direction of the circumference, said ribs have equal angular separations from one another, and in the case of the illustrated embodiment, exhibit a triangular profile, as is shown in FIG. 9. In the axial direction of the bore-hole 24, the ribs 26 extend over only a fraction of the length of the bore-hole, for example over 5 to 10% of the length of the bore-hole. The inner diameter of the bore-hole 24 and the outer diameter of the male part 14 are designed in such a manner that the male part 14 and the bore-hole 24 form a clearance—or a transition fit.

Prior to joining the temple end piece 4 and the shaft 2 together to form the temple, the shaft is cut to the required length, which is done on account of the fact that a piece is cut off from the male part 14 such that the temple has the desired, respectively required, length after the male part 14 is completely inserted into the bore-hole 24.

After cutting the shaft 2 to length, its male part 14 is inserted into the bore-hole 24, until the state illustrated in FIGS. 8 and 9 is achieved. The temple 2 and the temple end piece 4 can be rotated relatively with respect to one another around the axis of the bore-hole in this state, without any resistance worth mentioning acting counter to this rotation. In this manner, the shaft 2 and the temple end piece 4 are brought into a relative rotational position with respect to one another in this state, such that the desired, respectively the required, angle of the inclination B is present. When this is the case, the male part, from the position illustrated in FIG. 8, is brought into the position illustrated in FIG. 10, in other words, it is completely inserted into the bore-hole 24. During this process, the three ribs 26 mesh with the wall of the male part 14, which the ribs cut and press into. This occurs under the process of the mutual deformation of the three ribs 26 on the one hand and of the webs between the grooves 16 on the other hand, such that the state illustrated in FIGS. 10 and 11 results. During this process, the inner edge of each rib 26 is deformed to form a wavy line, with each rib 26 being deformed the most at those points where a web is located between the grooves 16, and being deformed the least at those points, where grooves 16 is present. Because the ribs 26 also press into the webs, the latter are deformed in the area of the ribs 26, as is shown in FIG. 11. A positive connection is formed on account of this deformation, with the positive connection exerting a considerable resistance to a relative rotation around the axis of the bore-hole between the first segment 18 and the male part 14. The wave-like deformation of the ribs 26, which has already been elucidated and shown in FIG. 10, results in a fixed connection in the axial direction of the bore-hole, such that the telescoping connection is very firm in the axial direction as well as in the circumferential direction on account of this "interlocking." As follows on the basis of the previous description, it is ensured at the same time that the temple has the desired length and that the temple end piece has the desired inner inclination. The length of the temple and the inner inclination can be produced differently for each temple and adjusted to the needs of the respective wearer of the glasses.

FIG. 12 shows a modification of the telescoping connection in an illustration similar to that in FIG. 9. The special characteristic of the modification in accordance with FIG. 12 consists of the fact that three longitudinal grooves 28 are located in the wall of the male part 14, namely at those positions that correspond to the ribs 26. This makes it possible to insert the male part 14 completely into the bore-hole 24 at first after cutting the male part to length, with the ribs 26 being positioned in the longtiduinal grooves 28 during this time, and only then to rotate the temple 2 and the first segment 18 around the axis of the bore-hole to such an extent that the desired angle of the inclination B has been set. During this rotation the webs between the grooves 16 mesh with the ribs 26, which results in a mutual plastic deformation of the webs and the ribs 26, in such a manner that a similar state of interlocking is achieved as was previously illustrated with the help of FIGS. 10 and 11.

FIG. 7 shows another embodiment of the invention. This embodiment elucidates the fact that the temple end piece need not necessarily have the design illustrated with the help of FIGS. 1 and 5. Rather, the segment of apposition 22 of the first embodiment can be missing and second segment 20 can lie in direct apposition to the head of the wearer of the glasses, as is the case for the so-called "Golf temples." Otherwise, the embodiment in accordance with FIG. 7 corresponds to the embodiment in accordance with FIGS. 1 to 5.

Figure 14:
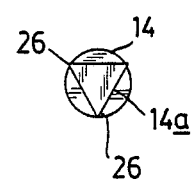
FIG. 14 is a cross section, taken at line L-L in FIG. 13.

Finally, FIGS. 13 and 14 show an embodiment of the invention in which the insertion and 14a of the male part 14 is provided with a polygonal cross section which, in this case, is seen as a triangle. The longitudinally extending edges of the insertion end 14a comprise the ribs 26 which deform and cut into circumferentially extending webs disposed between grooves 16 provided on the inner wall of the borehole 24.

It goes without saying that the previous descriptions illustrate only some and not all of the embodiments of the invention and that the invention is not limited to the previously described emdoiments.

I claim:

1. A temple for eyeglasses comprising an essentially straight shaft having means at one end thereof for connection to a cheekpiece or a hinge of the eyeglasses, and a temple end piece at the other end of said shaft, said end piece including an essentially straight first segment which forms an extension of the shaft, and a second segment extending downwardly from the first segment at an angle of less than 180, said shaft and said end piece being connected together by a telescoping connection, said connection comprising at least one longitudinally extending rib on one of the telescoping parts to be connected, and a plurality of circumferential webs and grooves on the other of said parts to be connected, said rib protruding radially between said shaft and said end piece and deforming said webs in said telescoping connection as said telescoping parts are longitudinally moved together after having been positioned such that the temple end piece lies in a selected plane containing said shaft whereby said shaft and said end piece are interconnected by said rib and said webs to prevent relative rotation therebetween.

2. A temple according to claim 1, wherein said rib is located on said shaft.

3. A temple according to claim 2, wherein said shaft has a cross-section in the form of a regular polygon in said telescoping connection with the edges of the polygon forming a plurality of ribs.

4. A temple according to claim 2, wherein said rib on said shaft is located near an open end of a bore-hole in said end piece, said bore-hole having an essentially constant diameter over its entire length.

5. A temple according to claim 4, wherein said bore-hole is provided in the first segment of the temple end piece.

6. A temple according to claim 2, wherein said rib on said shaft is located at the free end of the shaft, said end piece having a bore-hole having a decreased diameter in the area of the free end of the shaft.

7. A temple according to claim 1, wherein said rib protrudes radially inwardly from the wall of a bore-hole in said end piece.

8. A temple according to claim 7, wherein said bore-hole is essentially cylindrical and has an essentially constant diameter over its entire length.

9. A temple according to claim 1, wherein said grooves are formed by a screw thread.

10. A temple according to any one of claims 1 through 5, wherein the interengaged portions of the telescoping connection are comprised of a plastic material.

* * * * *